(12) United States Patent
Bretscher et al.

(10) Patent No.: US 12,170,752 B2
(45) Date of Patent: Dec. 17, 2024

(54) MULTI-PROCESSOR SUPPORT FOR ARRAY IMAGERS

(71) Applicant: Google Technology Holdings LLC, Mountain View, CA (US)

(72) Inventors: John T. Bretscher, Elgin, IL (US); Randall S. Vaas, Wyoming, MI (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

(21) Appl. No.: 18/339,001

(22) Filed: Jun. 21, 2023

(65) Prior Publication Data

US 2024/0007608 A1 Jan. 4, 2024

Related U.S. Application Data

(63) Continuation of application No. 17/834,190, filed on Jun. 7, 2022, now Pat. No. 11,765,337, which is a
(Continued)

(51) Int. Cl.
| | |
|---|---|
| H04N 13/282 | (2018.01) |
| G06T 1/20 | (2006.01) |
| H04N 13/161 | (2018.01) |
| H04N 19/107 | (2014.01) |
| H04N 19/42 | (2014.01) |
| H04N 19/436 | (2014.01) |
| H04N 19/503 | (2014.01) |
| H04N 19/593 | (2014.01) |

(Continued)

(52) U.S. Cl.
CPC ............ *H04N 13/282* (2018.05); *G06T 1/20* (2013.01); *H04N 13/161* (2018.05); *H04N 19/107* (2014.11); *H04N 19/436* (2014.11); *H04N 19/439* (2014.11); *H04N 19/503* (2014.11); *H04N 19/593* (2014.11); *H04N 19/597* (2014.11); *H04N 19/62* (2014.11); *H04N 23/45* (2023.01); *H04N 23/75* (2023.01); *H04N 23/80* (2023.01); *H04N 23/957* (2023.01)

(58) Field of Classification Search
None
See application file for complete search history.

(56) References Cited

U.S. PATENT DOCUMENTS

| | | |
|---|---|---|
| 5,714,997 A | 2/1998 | Anderson |
| 6,061,083 A | 5/2000 | Aritake et al. |

(Continued)

*Primary Examiner* — Paul M Berardesca
(74) *Attorney, Agent, or Firm* — DORITY & MANNING P.A.

(57) ABSTRACT

Using the techniques discussed herein, a set of images is captured by one or more array imagers (106). Each array imager includes multiple imagers configured in various manners. Each array imager captures multiple images of substantially a same scene at substantially a same time. The images captured by each array image are encoded by multiple processors (112, 114). Each processor can encode sets of images captured by a different array imager, or each processor can encode different sets of images captured by the same array imager. The encoding of the images is performed using various image-compression techniques so that the information that results from the encoding is smaller, in terms of storage size, than the uncompressed images.

20 Claims, 8 Drawing Sheets

Related U.S. Application Data continuation of application No. 16/372,678, filed on Apr. 2, 2019, now Pat. No. 11,375,175, which is a continuation of application No. 15/811,033, filed on Nov. 13, 2017, now Pat. No. 10,264,234, which is a continuation of application No. 15/091,733, filed on Apr. 6, 2016, now Pat. No. 9,832,448, which is a continuation of application No. 14/319,285, filed on Jun. 30, 2014, now Pat. No. 9,319,576.

(60) Provisional application No. 61/932,852, filed on Jan. 29, 2014.

(51) Int. Cl.
    *H04N 19/597* (2014.01)
    *H04N 19/62* (2014.01)
    *H04N 23/45* (2023.01)
    *H04N 23/75* (2023.01)
    *H04N 23/80* (2023.01)
    *H04N 23/957* (2023.01)

(56) References Cited

U.S. PATENT DOCUMENTS

| | | |
|---|---|---|
| 6,573,819 B1 | 6/2003 | Oshima et al. |
| 7,239,344 B1 | 7/2007 | Ikoma et al. |
| 8,170,326 B2 | 5/2012 | Gulati et al. |
| 2004/0141068 A1 | 7/2004 | Adachi |
| 2006/0104600 A1* | 5/2006 | Abrams ........... H04N 21/41407 |
| | | 386/230 |
| 2011/0012995 A1 | 1/2011 | Watanabe et al. |
| 2011/0080487 A1 | 4/2011 | Venkataraman |
| 2011/0246759 A1 | 10/2011 | Lai |
| 2012/0120256 A1* | 5/2012 | Hwang ................. H04N 23/45 |
| | | 348/207.1 |
| 2013/0021447 A1 | 1/2013 | Brisedoux et al. |
| 2013/0188708 A1 | 7/2013 | Rusert et al. |
| 2013/0222656 A1 | 8/2013 | Kaneko |
| 2013/0329008 A1 | 12/2013 | Takahashi et al. |
| 2014/0036032 A1 | 2/2014 | Takahashi et al. |
| 2014/0063184 A1 | 3/2014 | Chang |
| 2014/0071131 A1 | 3/2014 | Kitago |
| 2014/0132735 A1 | 5/2014 | Lee |
| 2014/0232904 A1 | 8/2014 | Na |
| 2014/0320611 A1 | 10/2014 | Choi |
| 2015/0201143 A1* | 7/2015 | Ono ..................... H04N 23/631 |
| | | 348/302 |
| 2015/0208103 A1 | 7/2015 | Guntur et al. |
| 2016/0037049 A1 | 2/2016 | Niida |
| 2016/0227016 A1 | 8/2016 | Kim |
| 2017/0031138 A1 | 2/2017 | Laroia |

\* cited by examiner

MULTI-PROCESSOR SUPPORT FOR ARRAY IMAGERS

RELATED APPLICATIONS

This application is a continuation of U.S. application Ser. No. 17/834,190, now U.S. Pat. No. 11,765,337, having a filing date of Jun. 7, 2022, which is a continuation of U.S. application Ser. No. 16/372,678, now U.S. Pat. No. 11,375,175, having a filing date of Apr. 2, 2019, which is a continuation of U.S. application Ser. No. 15/811,033, now U.S. U.S. Pat. No. 10,264,234, having a filing date of Nov. 13, 2017, which is a continuation of U.S. application Ser. No. 15/091,733, now U.S. Pat. No. 9,832,448, having a filing date of Apr. 6, 2016, which is a continuation of U.S. application Ser. No. 14/319,285 now U.S. U.S. Pat. No. 9,319,576, having a filing date of Jun. 30, 2014, which claims the benefit of U.S. Provisional Application Ser. No. 61/932,852 filed Jan. 29, 2014. Each of U.S. application Ser. No. 17/834,190, U.S. application Ser. No. 16/372,678, U.S. application Ser. No. 15/811,033, U.S. application Ser. No. 15/091,733, U.S. application Ser. No. 14/319,285 and U.S. Provisional Application Ser. No. 61/932,852 is hereby incorporated by reference in its entirety for all purposes.

BACKGROUND

The amount of information in a digital image can be enormous. For a set of images, that amount increases proportionally with the number of images in the set. Consequently, both storing and transmitting a set of images can place a substantial burden on computing resources of a device. This can result in slow operation of the device, which can reduce the user friendliness and increase user frustration with the device.

BRIEF DESCRIPTION OF THE DRAWINGS

Embodiments of multi-processor support for array imagers are described with reference to the following drawings. The same numbers are used throughout the drawings to reference like features and components.

DETAILED DESCRIPTION

Multi-processor support for array imagers is discussed herein. Using the techniques discussed herein, a set of images is captured by one or more array imagers. Each array imager includes multiple imagers configured in various manners. Each array imager captures multiple images of substantially a same scene at substantially a same time. The images captured by each array imager are encoded by multiple processors. Each processor can encode sets of images captured by a different array imager or each processor can encode different sets of images captured by the same array imager. The encoding of the images is performed using various image-compression techniques so that the information that results from the encoding is smaller, in terms of storage size, than the uncompressed images.

Figure 1:
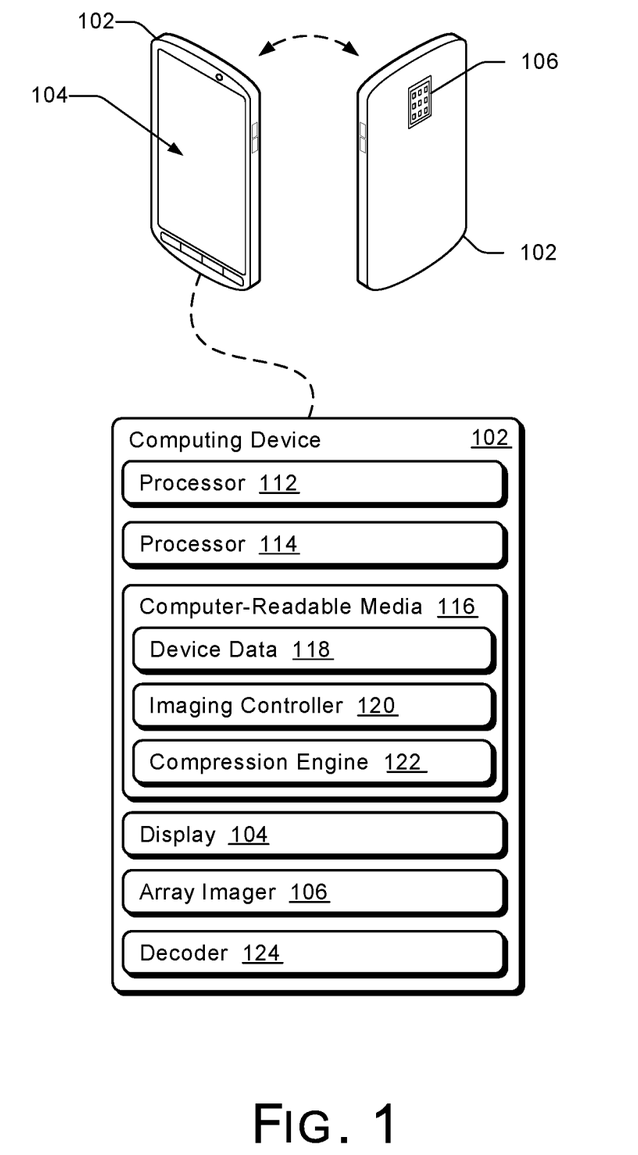
FIG. 1 illustrates an example computing device implementing the techniques discussed herein.

FIG. 1 illustrates an example computing device 102 implementing the techniques discussed herein. Computing device 102 can be, or include, many different types of computing or electronic devices. In this example, computing device 102 is shown as a smartphone, though other devices are contemplated. Other computing devices 102 may include, by way of example, a cellular phone, notebook computer (e.g., netbook or ultrabook), laptop computer, camera (e.g., compact or single-lens reflex), smart-watch, smart-glasses, tablet computer, personal media player, personal navigating device (e.g., global positioning system), gaming console, desktop computer, video camera, or portable gaming device.

Computing device 102 includes a display 104 and an array imager 106. Display 104 can be configured as any suitable type of display, such as an organic light-emitting diode (OLED) display, active matrix OLED display, liquid crystal display (LCD), in-plane shifting LCD, and so on. Display 104 is situated on one side of computing device 102, and array imager 106 is situated on the opposite side of computing device 102, although array imager 106 can alternatively be situated on a different side of computing device 102 (e.g., the same side as display 104). Array imager 106 includes multiple imagers that are generally located very close together in an array, allowing multiple images of substantially a same scene to be captured at substantially a same time. The multiple images being of substantially a same scene refers to at least a threshold amount of the scene captured being the same (e.g., 95% or 98% of the scene) in each image, although some differences may occur due to different locations or characteristics of imagers of array imager 106 or due to different locations of array imagers. The multiple images being captured at substantially a same time refers to the multiple images being captured within a threshold amount of time of one another (e.g., the multiple images are all captured within 0.0167 seconds, within 1 second, etc.). Although one array imager 106 is shown in FIG. 1, computing device 102 can include any number of distinct array imagers.

Two or more of the imagers in array imager 106 can be the same (e.g., have the same characteristics such as spectral sensitivity, resolution, size, and so forth). Alternatively, two or more of the imagers in array imager 106 can be different, having different characteristics such as spectral sensitivity, resolution, numbers of pixels, sizes of pixels, sizes of imagers, and so forth.

The imagers in array imager 106 can each have a different filter or be configured for a different spectral sensitivity. By configuring the imagers of an array with unique filters or for unique spectral sensitivities, array imager 106 may capture a set of images of a same scene, at a same time, and with different spectral sensitivities. Using different imagers, the array imager 106 is capable of sensing both light that is perceivable by the human eye (e.g., visible light) as well as radiation that is not perceivable by the human eye, such as infrared, ultraviolet, x-ray, low-lux light, and so on.

In some implementations, the different filters or different spectral sensitivities with which a set of images are captured results in images of differing resolutions. An infrared image may have a lower resolution (because infrared has a longer wavelength of light or due to a smaller amount of light in those wavelengths) than a visible-light image, for example. Such differences can be used to order the images in a set from highest to lowest resolution. In this way, a given image may be encoded from images of higher resolutions.

Although imagers in array imager 106 are located closely together, each imager nevertheless captures a slightly different image of a scene due to this difference in location on the imager. By way of example, the imagers may be located in a same column of the array and as a result images captured by the imagers exhibit no left-right shift. Rather, the images appear to lie along a same vertically-oriented plane. In the illustrated example, the array imager 106 is arranged as a three by three (3×3) grid of imagers. Due to the difference in vertical location of imagers in the array, images captured by these imagers may exhibit a vertical shift, one image to another.

Figure 2:
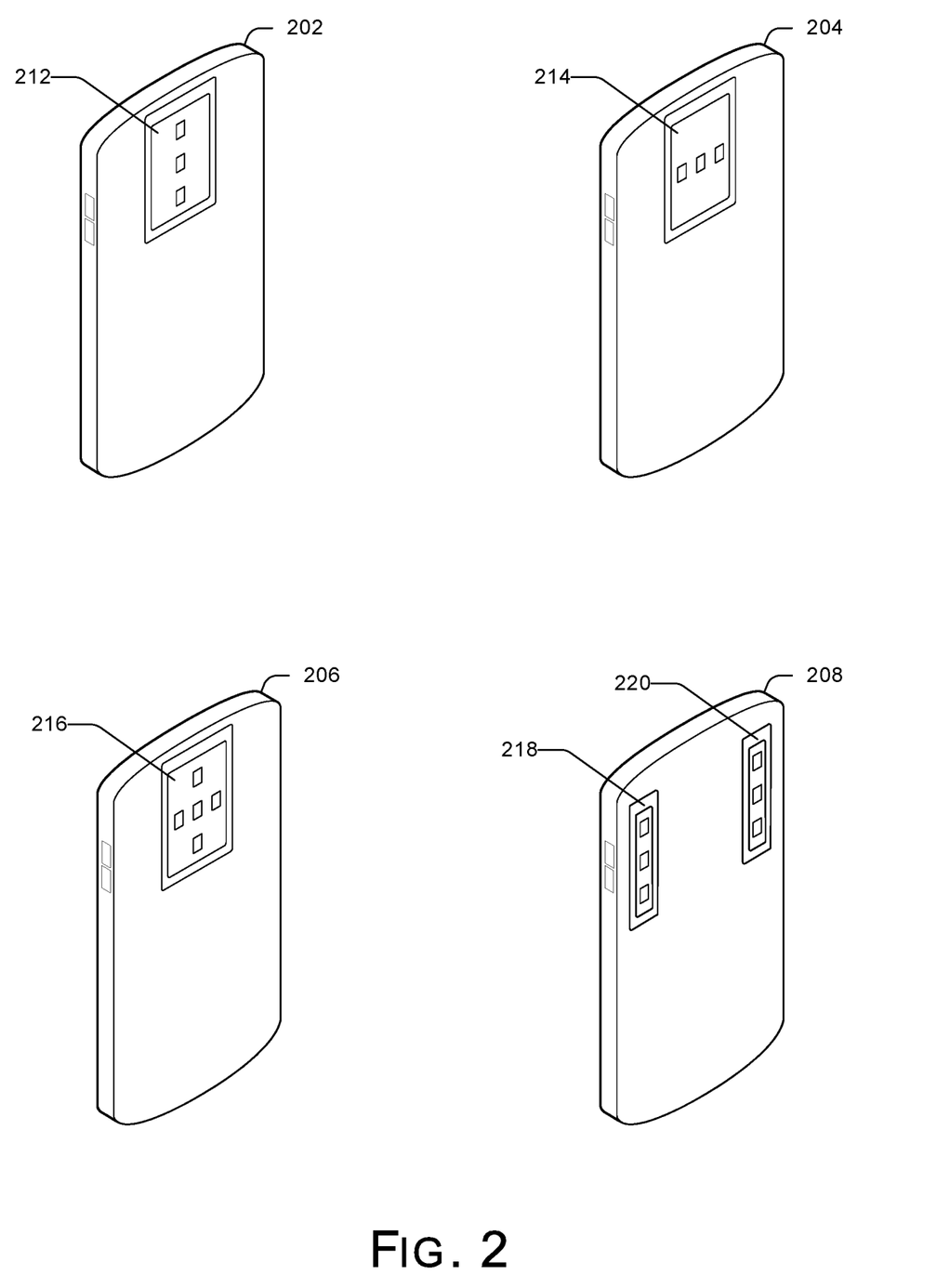
FIG. 2 illustrates multiple different imager arrangements for an array imager of a computing device.

Although the array imager 106 is arranged as a three by three (3×3) grid of imagers in the example of FIG. 1, various other imager arrangements can be used. An array imager 106 has multiple imagers and can include any number of imagers arranged in any configuration. FIG. 2 illustrates multiple different imager arrangements for an array imager of a computing device. Computing devices 202, 204, 206, and 208 are illustrated in FIG. 2, each of which can be a computing device 102 of FIG. 1 although with a different array imager.

In the illustrated example of FIG. 2, computing device 202 includes an array imager 212 having three imagers arranged along a same vertically-oriented plane. Computing device 204 includes an array imager 214 having three imagers arranged along a same horizontally-oriented plane. Computing device 206 includes an array imager 216 having five imagers arranged in a "+" configuration with three of the imagers arranged along a same horizontally-oriented plane and three of the imagers arranged along a same vertically-oriented plane. A computing device can also include multiple array imagers. For example, computing device 208 includes two array imagers 218 and 220 each including three imagers arranged along a same vertically-oriented plane.

Returning to FIG. 1, computing device 102 also includes multiple processors 112 and 114, which may be configured as distinct processors or distinct cores of a single processor capable of enabling various functionalities of computing device 102. Processors 112 and 114 may be coupled with, and may implement functionalities of, any other components or modules of computing device 102 that are described herein. Although two processors 112 and 114 are shown in FIG. 1, computing device 102 can include any number of processors.

Computing device 102 includes computer-readable media 116. Computer-readable media 116 includes device data 118, such as an operating system, firmware, or applications of computing device 102 that are executable by processors 112 and 114. Alternatively or additionally, device data 118 may include various user data, such as images (e.g., those captured by an array imager), music, documents, emails, contacts, and the like. Computer-readable media 116 also includes imaging controller 120 and compression engine 122, which in this example are embodied as computer-executable code stored on computer-readable media 116.

Imaging controller 120 manages array imager 106 and the image capturing performed thereby. For example, imaging controller 120 can employ array imager 106 to capture a set of images of a scene based on a user selection to perform the capture. Based on user input, the imaging controller 120 can adjust which portions of a scene are captured by array imager 106. A user input may be received, for instance, for zooming in to capture a portion of the scene. Accordingly, the imaging controller 120 can cause the array imager 106 to zoom in so that when the images of the scene are captured they are zoomed in from a previous level of zoom. In a similar manner, the imaging controller 120 can cause the array imager 106 to zoom out so that when images of a scene are captured they are zoomed out from a previous level of zoom.

In addition or alternatively, imaging controller 120 can be employed to configure the individual imagers of the array imager 106. For example, the imaging controller 120 may be employed to change a type of radiation to which an individual imager is sensitive. The imaging controller 120 may adjust an individual imager in the array imager 106 from being sensitive to visible light so that it is sensitive instead to ultraviolet light, infrared, or some other type of radiation. Likewise, imaging controller 120 may adjust an individual imager in the array imager 106 from being sensitive to ultraviolet light, infrared, or some other type of radiation so that it is instead sensitive to visible light.

In other words, imaging controller 120 may configure individual imagers in the array imager 106 from being sensitive to one type of radiation to being sensitive to a different type of radiation. To do so, imaging controller 120 may cause a filter for an individual imager to be changed so that the individual imager is thereafter sensitive to the different type of radiation. Imaging controller 120 may configure the individual imagers of the array imager 106 based on user input to do so. Imaging controller 120 may also configure the individual imagers of the array imager 106 automatically, such as based on a determination that the set of images is being captured in the dark (e.g., at night), that the scene includes an object for which a particular type of radiation may provide interesting information about the object, and so on.

In some implementations, however, the imagers of the array imager 106 may not be configurable such that a type of radiation to which an imager is sensitive can be changed at any given time. Instead, the imagers of the array imager 106 may be statically configured such that each individual imager is sensitive to just one particular type of radiation for a life of the imager. In such implementations the imaging controller 120 does not configure the individual imagers of the array imager 106 from being sensitive to one type of radiation to being sensitive to another type of radiation. It is also within the scope of the techniques described herein that the array imager 106 include a combination of both imagers that can be configured to change the type of radiation to which they are sensitive and imagers that cannot be configured to change the type of radiation to which they are sensitive.

The imaging controller 120 can also manage the imagery or content presented on display 104. For example, imaging controller 120 can cause display 104 to present multiple views of a scene. Imaging controller 120 can cause images that have already been captured of the scene to be presented on display 104. Additionally, imaging controller 120 can cause a scene to be presented on display 104 in real-time.

Array imager 106 allows multiple images of a scene to be captured at substantially a same time. Array imager 106 includes multiple imagers configured in an array so that the array imager 106 takes a set of images substantially simultaneously. The multiple imagers of array imager 106 are generally located very close together in the array. As a result, a set of images captured using array imager 106 exhibits little "parallax"—a displacement or difference in apparent position of an object viewed along two different lines of sight that is measured by the angle or semi-angle of inclination between those two lines of sight—among the images.

Compression engine 122 can encode images captured by array imager 106 using various image-compression techniques so that the information that results from the encoding is smaller, in terms of storage size, than the uncompressed images. The compression engine 122 can encode images and video captured by array imager 106 using one or more of the following: spatial prediction, temporal prediction, and spectral prediction. For example, the compression engine 122 can encode images using spatial prediction, temporal prediction, spectral prediction, spatio-temporal prediction, spatio-spectral prediction, spatio-temporal-spectral prediction, and so on.

The different techniques that compression engine 122 uses to encode images can be based on delta encoding. Broadly speaking, delta encoding is a way of storing or transmitting data in the form of differences between different items of data rather than the different items of data in whole. Delta encoding techniques produce a technical description of the difference between two items of data—a source data item and a target data item. Given the source data item and the target data item, delta encoding techniques produce difference data that enable the target data item to be reconstructed from the source data item and the difference data item.

Given a single image, for instance, compression engine 122 can use spatial prediction to encode the image. Spatial prediction (also referred to as spatial encoding) involves predicting the color (and other values) of a region in a single image from the values of nearby regions in the image. Additionally or alternatively, spatial prediction involves predicting the color (and other values) of a region in a single image from the values of corresponding regions in another image captured of substantially the same scene. The predicted value is compared against the actual value. When encoded, the region is represented by a delta between the region's predicted value and the region's actual value. When decoding, the process is reversed: the region value is predicted from nearby known regions in the image or corresponding known regions in another image and the delta is applied to get the actual value of the region. In most cases, this method allows a tremendous amount of image compression, that is, a tremendous saving in the amount of resources needed to represent the image.

For images ordered in a temporal sequence, such as video content, compression engine 122 can use temporal prediction to encode a given image of the sequence. Temporal prediction involves predicting regions in a frame using corresponding regions in previous frames, subsequent frames, or both previous and subsequent frames of the sequence. The region in a frame can be represented by a delta between the value predicted using the previous or subsequent frames and the region's actual value. The sequence may include multiple image sequences each of which is captured by a different imager of the array imager 106. Each image sequence includes multiple images, each of which can be treated by the compression engine 122 as a separate image. For one of these image sequences, the compression engine 122 can use temporal prediction to predict information representative of an image given another image of the image sequence that corresponds to a different point in time (e.g., an image that is previous or subsequent to the given image).

Compression engine 122 can also use spectral prediction techniques to encode an image in a set of images captured by array imager 106. Spectral prediction involves predicting information representative of one image using information representative of another image and a model representing the difference in spectral sensitivities between the image and the other image. The one image and the other image both comprise images in a set that are captured by imagers of array imager 106, at substantially a same time, but with different spectral sensitivities, e.g., because the corresponding imagers filter for different types of radiation. The compression engine 122 can predict information for the one image based on the other image by accounting for the different spectral sensitivities with which the images are captured. The compression engine 122 can then use delta encoding to encode the set of images, given the prediction and a delta between the prediction and the actual image information.

Compression engine 122 can also select which type of encoding to use to encode unencoded images. To do so, the compression engine 122 can determine an amount that different encodings compress images captured with an array imager. For example, the compression engine 122 can determine amounts that information encoded using spatial prediction, information encoded using spectral prediction, and information encoded using temporal prediction compress the images captured by array imager 106. The compression engine 122 can then select the encoding that compresses the images a greatest amount. Continuing with the preceding example, the compression engine 122 can select, for encoding unencoded images, whichever of the spatial prediction, temporal prediction, spectral prediction, or combination thereof is determined to compress the images a greatest amount.

After being encoded, various different actions can be taken with the encoded images. For example, the encoded images can be transmitted to another device distinct from the computing device 102 (e.g., for further processing, storage, viewing, etc.), can be stored on a storage device of the computing device 102, and so forth.

Computing device 102 may also include decoder 124, which is configured to decode images that are encoded using one or a combination of spatial prediction, temporal prediction, and spectral prediction. Compression engine 122 can determine a type of encoding used to encode image information. Given the type of encoding, the decoder 124 can be employed to decode an encoded image or a set of encoded images. For example, compression engine 122 may determine that a set of encoded images is encoded using spectral prediction and communicate an indication of this determined encoding to decoder 124. Decoder 124 may then decode the encoded set of images based on the determination that the set of images was encoded using spectral prediction. In a similar manner, decoder 124 may decode encoded image data that is encoded using spatial or temporal prediction.

In addition, computing device 102 includes data interfaces (not shown) for communicating data via a network or other connection. In some cases, these data interfaces are wireless transceivers for communicating via a wireless network (not shown) or directly with other devices, such as by near-field communication. Examples of these wireless networks include a wireless wide-area network (WWAN), wireless local-area network (WLAN), and wireless personal-area network (WPAN), each of which may be configured, in part or entirely, as infrastructure, ad-hoc, or mesh networks. For example, an interface configured as a short-range wireless transceiver may communicate over a WPAN in accordance with a Bluetooth™ protocol.

Alternatively or additionally, data interfaces include wired data interfaces for communicating with other devices, such as a local area network (LAN) Ethernet transceiver, serial-data interface, audio/video port (e.g., high-definition multimedia interface (HDMI) port), or universal serial bus (USB) port. These wired data interfaces may be implemented using standard connectors or through the use of proprietary connectors and associated cables providing enhanced security or interconnect density.

Through these data interfaces, computing device 102 can transmit captured images that have been encoded according to one of the described techniques. The captured images can be transmitted to various other devices or services, such as another computing device, a storage device, and so forth.

Alternatively or additionally, through these data interfaces computing device 102 can obtain a set of images captured by an array imager. The obtained set of images may not be encoded according to one of the described techniques or may have been encoded by such techniques. When unencoded images captured by an array imager are received through the data interfaces, compression engine 122 can be employed to cause these images to be encoded. On the other hand, if encoded images captured by an array imager are received through the data interfaces, compression engine 122 can determine what type of encoding was used to encode the images. The compression engine 122 can communicate an indication of the determined encoding to decoder 124, which can decode the images given the encoding type.

In any case, a computing device that does not include an array imager can be capable of encoding images captured by an array imager or of decoding encoded images captured by an array imager. By way of example, a set of images may be captured by an array imager at a mobile device. Rather than performing the encoding at the mobile device, the mobile device may communicate the set of unencoded images to a different computing device, e.g., to a desktop, a server, and so on. The computing device to which the set of unencoded images is communicated may then perform the encoding using the techniques described herein. Alternatively, a compression engine at the mobile device may cause the set of images captured by the array imager of the mobile device to be encoded at the mobile device. The encoded images may then be sent to the different computing device that is capable of employing a decoder to decode the images encoded at the mobile device.

The processing needed to apply the various encoding techniques discussed herein can be overwhelming, especially when the array imager 106 is repeatedly capturing sets of images. Computing device 102 includes multiple processors 112 and 114 that are assigned to the encoding tasks. The encoding tasks can be assigned to different ones of the processors 112 and 114 in different manners, as discussed in more detail below.

The techniques discussed herein leverage the fact that a set of images of substantially the same scene are captured at substantially the same time. Rather than trying to manage different processors performing encoding tasks on different regions of the same image, different processors can perform encoding tasks on different images in a same set of images or in different sets of images.

Figure 3:
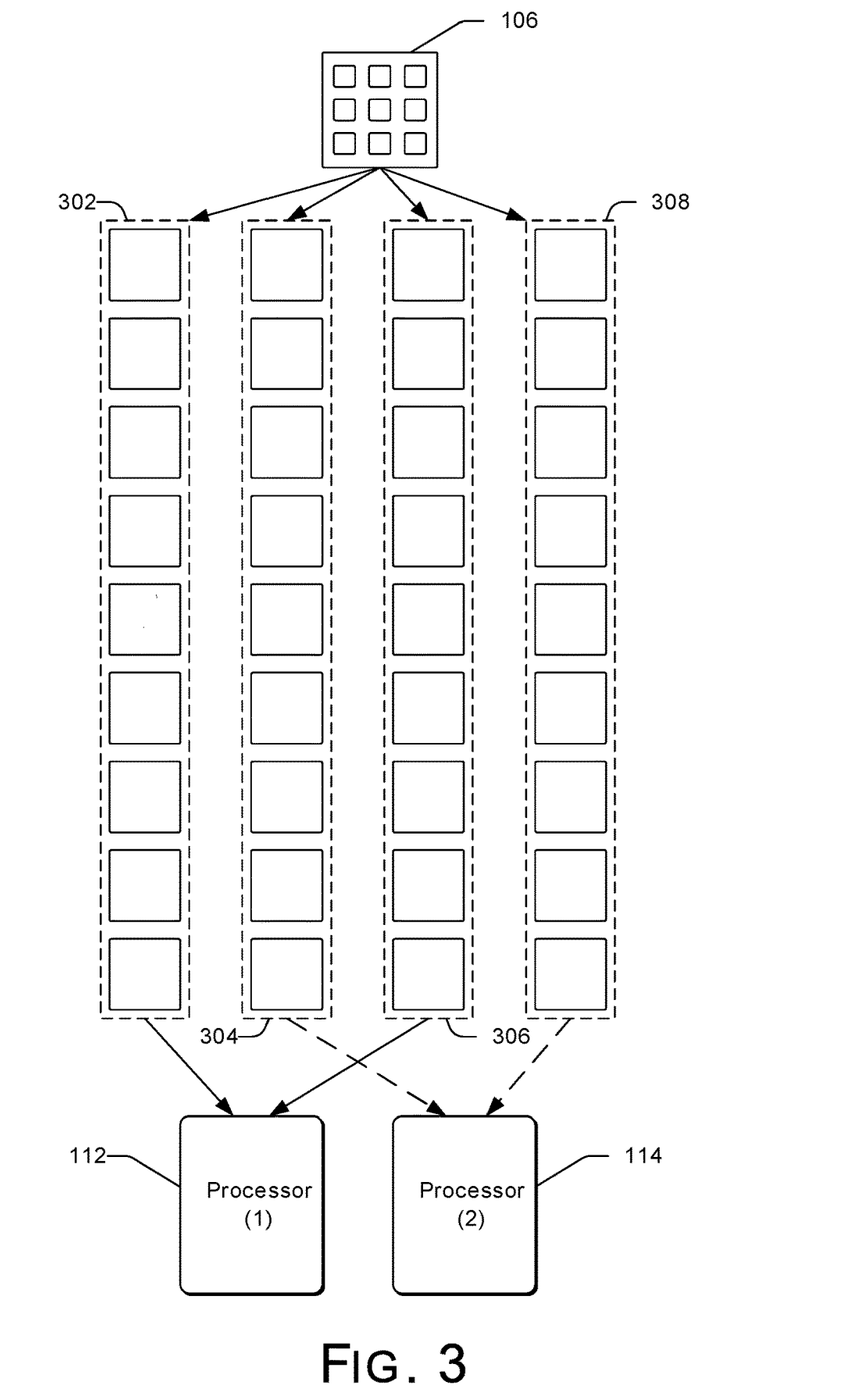
FIG. 3 illustrates an example embodiment in which multiple processors perform encoding tasks for a single array imager.

FIG. 3 illustrates an example embodiment in which multiple processors perform encoding tasks for a single array imager. An array imager 106 includes nine imagers arranged as a three-by-three grid of imagers. The array imager 106 captures a sequence of sets of images at various regular or irregular time intervals; the sets of images in the sequence thus varying temporally. For example, the array imager 106 may capture 24, 30, or 60 sets of images per second. In the illustrated example, image sets 302, 304, 306, and 308 are captured by the array imager 106. Each image in a set 302, 304, 306, or 308 is captured by one of the imagers in the array imager 106, and the images in a set 302, 304, 306, or 308 are captured substantially simultaneously. As there are nine imagers in the array imager 106, each set 302, 304, 306, and 308 includes nine images.

Encoding tasks, such as spatial or spectral prediction, for image sets are performed by processors 112 and 114, with processor 112 performing encoding tasks for some image sets, and processor 114 performing encoding tasks for other image sets. For example, encoding tasks for alternating sets of images can be performed by each processor, such as processor 112 performing encoding tasks for the odd-numbered sets of images in a sequence (e.g. image sets 302 and 306) and processor 114 performing encoding tasks for the even-numbered sets of images in the sequence (e.g., image sets 304 and 308). This gives each processor 112 and 114 twice as much time to perform the encoding as it would have if it were the only processor performing encoding tasks.

Although two processors are shown in FIG. 3, alternatively three or more processors can perform encoding tasks for image sets. For example, processor 112 can perform encoding tasks for every third image set starting with one particular image set (e.g., the $1^{st}$, $4^{th}$, $7^{th}$, $10^{th}$, etc., image sets), processor 114 can perform encoding tasks for every third image set starting with a different particular image set (e.g., the $2^{nd}$, $5^{th}$, $8^{th}$, $11^{th}$, etc., image sets), and a third processor can perform encoding tasks for every third image set starting with a still different particular image set (e.g., the $3^{rd}$, $6^{th}$, $9^{th}$, $12^{th}$, etc., image sets).

Figure 4:
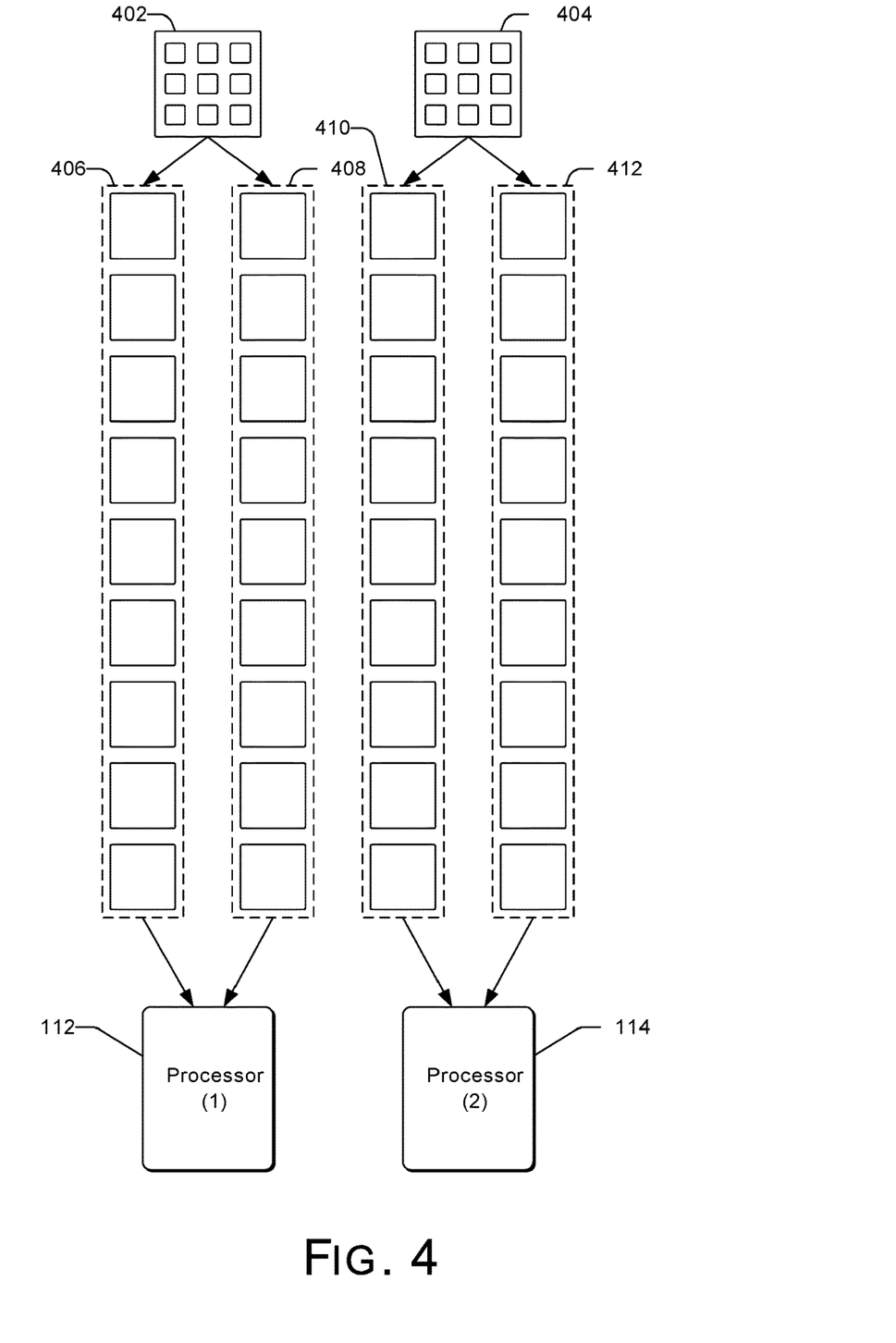
FIG. 4 illustrates an example embodiment in which multiple processors perform encoding tasks for multiple array imagers.

FIG. 4 illustrates an example embodiment in which multiple processors perform encoding tasks for multiple array imagers. Two array imagers 402 and 404 each include nine imagers arranged as a three-by-three grid of imagers. Each array imager 402 and 404 can be, for example, an array imager 106 discussed above. Each array imager 402 and 404 captures a sequence of sets of images at various regular or irregular time intervals; the sets of images in the sequence thus varying temporally. For example, each array imager 402 and 404 may capture 24, 30, or 60 sets of images per second. In the illustrated example, image sets 406 and 408 are captured by the array imager 402, and image sets 410 and 412 are captured by the array imager 404. Each image in a set 406 or 408 is captured by one of the imagers in the array imager 402, and the images in a set 406 or 408 are captured substantially simultaneously. Similarly, each image in a set 410 or 412 is captured by one of the imagers in the array imager 404, and the images in a set 410 or 412 are captured substantially simultaneously. As there are nine imagers in each array imager 402 and 404, each set 406, 408, 410, and 412 includes nine images.

Encoding tasks, such as spatial or spectral prediction, for image sets are performed by processors 112 and 114, with processor 112 performing encoding tasks for some image sets, and processor 114 performing encoding tasks for other image sets. For example, encoding tasks for sets of images captured by array imager 402 are performed by one processor (such as processor 112 performing encoding tasks for image sets 406 and 408 captured by the array imager 402), and encoding tasks for sets of images captured by array imager 404 are performed by another processor (such as processor 114 performing encoding tasks for image sets 410 and 412 captured by the array imager 404). This gives each processor 112 and 114 twice as much time to perform the encoding as it would have if it were the only processor performing encoding tasks.

Although two processors are shown in FIG. 4, alternatively three or more processors can perform encoding tasks for image sets. For example, an additional array imager can capture a sequence of sets of images at various regular or irregular time intervals. Encoding tasks for sets of images captured by the additional array imager can be performed by an additional processor.

Figure 5:
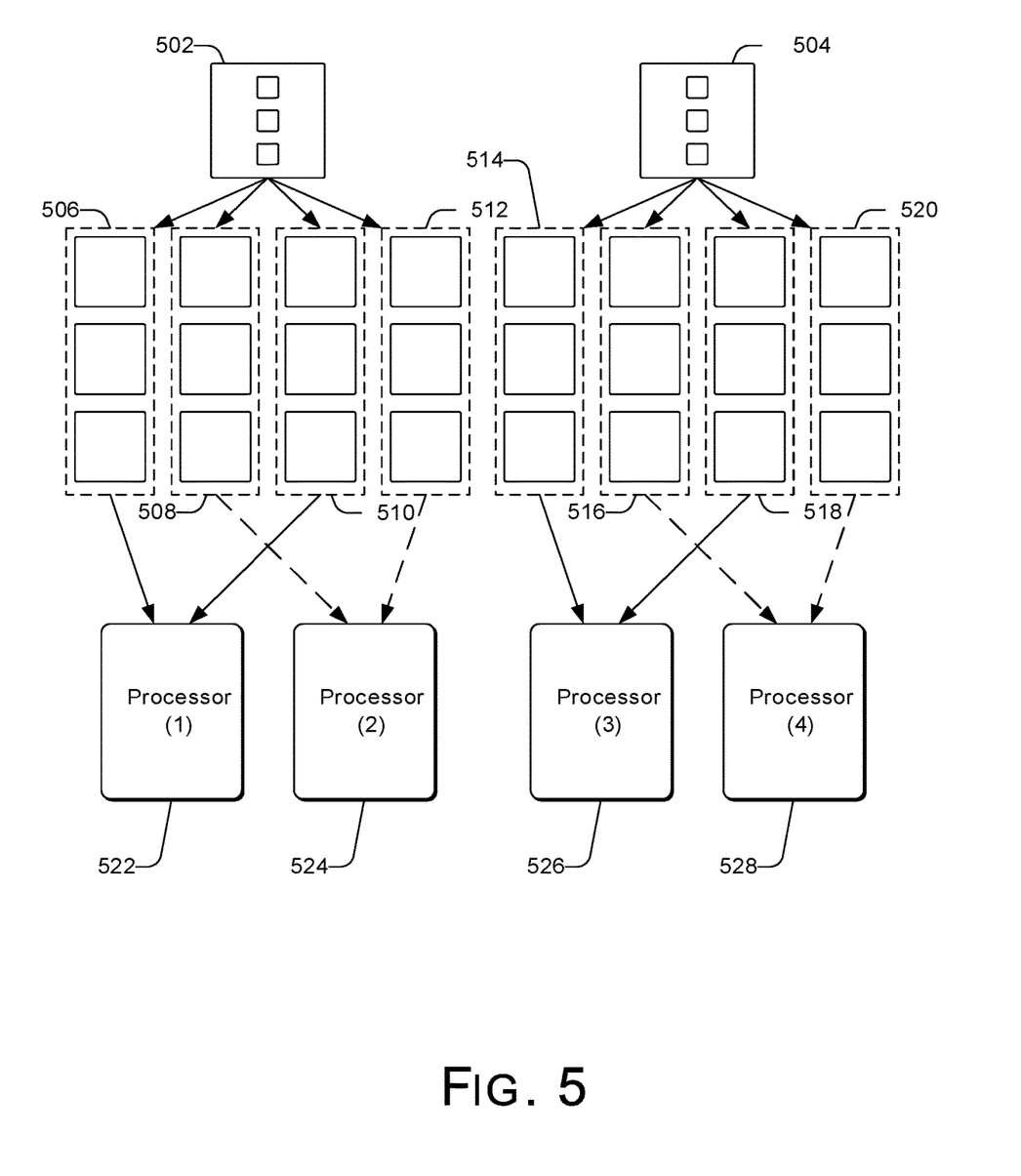
FIG. 5 illustrates another example embodiment in which multiple processors perform encoding tasks for multiple array imagers.

FIG. 5 illustrates another example embodiment in which multiple processors perform encoding tasks for multiple array imagers. Two array imagers 502 and 504 each include three imagers arranged as a column of imagers. Each array imager 502 and 504 can be, for example, an array imager 106 discussed above. Each array imager 502 and 504 captures a sequence of sets of images at various regular or irregular time intervals; the sets of images in the sequence thus varying temporally. For example, each array imager 502 and 504 may capture 24, 30, or 60 sets of images per second. In the illustrated example, image sets 506, 508, 510, and 512 are captured by the array imager 502, and image sets 514, 516, 518, and 520 are captured by the array imager 504. Each image in a set 506, 508, 510, or 512 is captured by one of the imagers in the array imager 502, and the images in a set 506, 508, 510, or 512 are captured substantially simultaneously. Similarly, each image in a set 514, 516, 518, or 520 is captured by one of the imagers in the array imager 504, and the images in a set 514, 516, 518, and 520 are captured substantially simultaneously. As there are three imagers in each array imager 502 and 504, each set 506, 508, 510, 512, 514, 516, 518, and 520 includes three images.

Encoding tasks, such as spatial or spectral prediction, for image sets are performed by processors 522, 524, 526, and 528, with processor 522 performing encoding tasks for some image sets, processor 524 performing encoding tasks for other image sets, processor 526 performing encoding tasks for still other image sets, and processor 528 performing encoding tasks for yet other image sets. For example, encoding tasks for sets of images captured by array imager 502 are performed by one of processor 522 and 524, such as encoding tasks for alternating sets of images being performed by each processor, e.g., processor 522 performing encoding tasks for the odd-numbered sets of images in a sequence captured by array imager 502 (e.g., image sets 506 and 510), and processor 524 performing encoding tasks for the even-numbered sets of images in the sequence captured by array imager 502 (e.g., image sets 508 and 512). Continuing with this example, encoding tasks for sets of images captured by array imager 504 are performed by one of processor 526 and 528, such as encoding tasks for alternating sets of images being performed by each processor, e.g., processor 526 performing encoding tasks for the odd-numbered sets of images in a sequence captured by array imager 504 (e.g., image sets 514 and 518), and processor 528 performing encoding tasks for the even-numbered sets of images in the sequence captured by array imager 504 (e.g., image sets 516 and 520).

Although four processors are shown in FIG. 5, alternatively five or more processors can perform encoding tasks for image sets. For example, processor 522 can perform encoding tasks for every third image set captured by array imager 502 starting with one particular image set (e.g., the $1^{st}$, $4^{th}$, $7^{th}$, $10^{th}$, etc., image sets), processor 524 can perform encoding tasks for every third image set captured by array imager 502 starting with a different particular image set (e.g., the $2^{nd}$, $5^{th}$, $8^{th}$, $11^{th}$, etc., image sets), and a third processor can perform encoding tasks for every third image set captured by array imager 502 starting with a still different particular image set (e.g., the $3^{rd}$, $6^{th}$, $9^{th}$, $12^{th}$ etc., image sets). By way of another example, an additional array imager can capture a sequence of sets of images at various regular or irregular time intervals, and encoding tasks for sets of images captured by the additional array imager can be performed by one or more additional processors.

The encoding tasks can also be performed in stages with some encoding tasks performed in one stage, and other encoding tasks performed in one or more later stages. For example, spatial or spectral prediction can be performed in one stage, and temporal prediction performed in a later stage.

Figure 6:
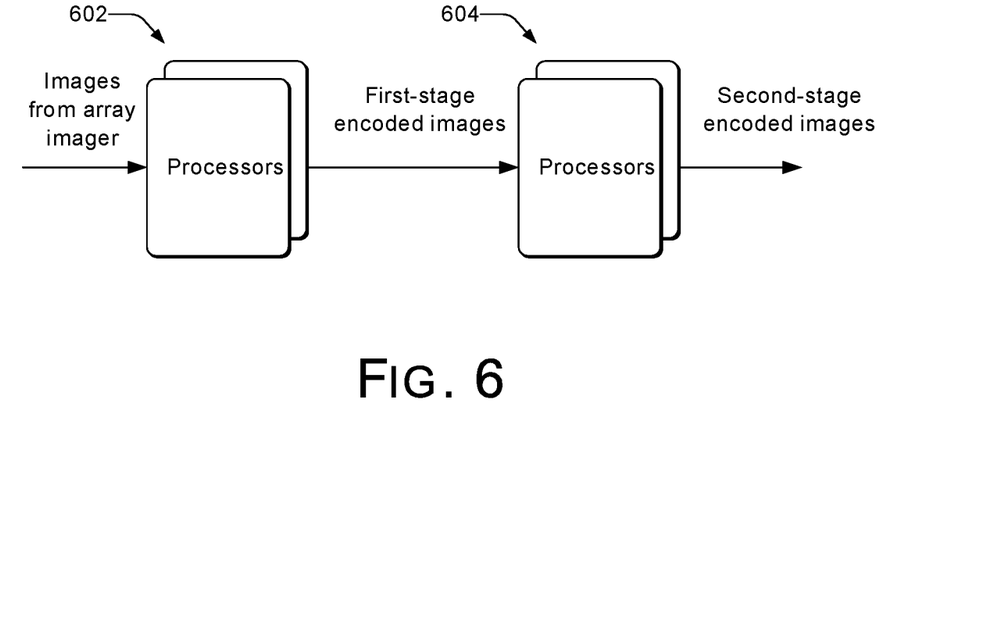
FIG. 6 illustrates an example embodiment in which multiple processors perform multi-stage encoding tasks for one or more array imagers.

FIG. 6 illustrates an example embodiment in which multiple processors perform multi-stage encoding tasks for one or more array imagers. Multiple processors 602 perform encoding tasks on images from one or more array imagers for a first stage resulting in first-stage encoded images. In the first stage, spatial or spectral prediction is performed by the processors 602 (e.g., as discussed above in FIGS. 3-5). Multiple additional processors 604 perform encoding tasks on the first-stage encoded images resulting in second-stage encoded images. For example, in the second stage temporal prediction can be performed by the processors 602. The processors 602 are distinct from the processors 604, so different processors perform the first stage than perform the second stage.

The second stage can alternatively be three-dimensional (3D) encoding. Although a set of images captured using one array imager exhibits little "parallax" between the images, there can be sufficient parallax between the images to perform 3D encoding of the images (e.g., encoding information representing a 3D scene) using 3D spatial prediction or various other encoding techniques. By performing 3D encoding of the images, 3D images can be generated from one or more sets of images. Additionally or alternatively, there can be sufficient parallax between the images in multiple sets of images captured using multiple array imagers to perform 3D encoding of the images.

Although two stages are illustrated in FIG. 6, alternatively one or more additional stages can be implemented. For example, three or four stages can be implemented, with each stage performing one of spectral prediction, spatial prediction, temporal prediction, and 3D encoding. The encoding tasks performed at each of the multiple stages are performed by different processors than perform the encoding tasks at others of the multiple stage.

Figure 7:
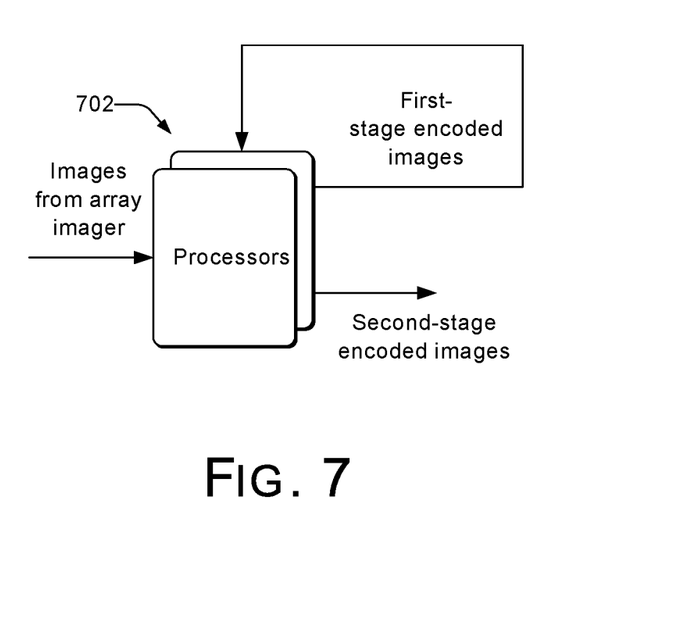
FIG. 7 illustrates another example embodiment in which multiple processors perform multi-stage encoding tasks for one or more array imagers.

FIG. 7 illustrates another example embodiment in which multiple processors perform multi-stage encoding tasks for one or more array imagers. Multiple processors 702 perform encoding tasks on images from one or more array imagers for a first stage resulting in first-stage encoded images. In the first stage, spatial or spectral prediction is performed by the processors 702 (e.g., as discussed above in FIGS. 3-5). The multiple processors 702 then cooperate with one another to perform encoding tasks on the first-stage encoded images resulting in second-stage encoded images. For example, in the second stage temporal prediction or 3D encoding can be performed by the processors 702. The same processors 702 perform the first stage as perform the second stage.

Although two stages are illustrated in FIG. 7, alternatively one or more additional stages can be implemented. For example, three or four stages can be implemented, with each stage performing one of spectral prediction, spatial prediction, temporal prediction, and 3D encoding. The encoding tasks performed at each of the multiple stages are performed by different processors than perform the encoding tasks at others of the multiple stages.

Figure 8:
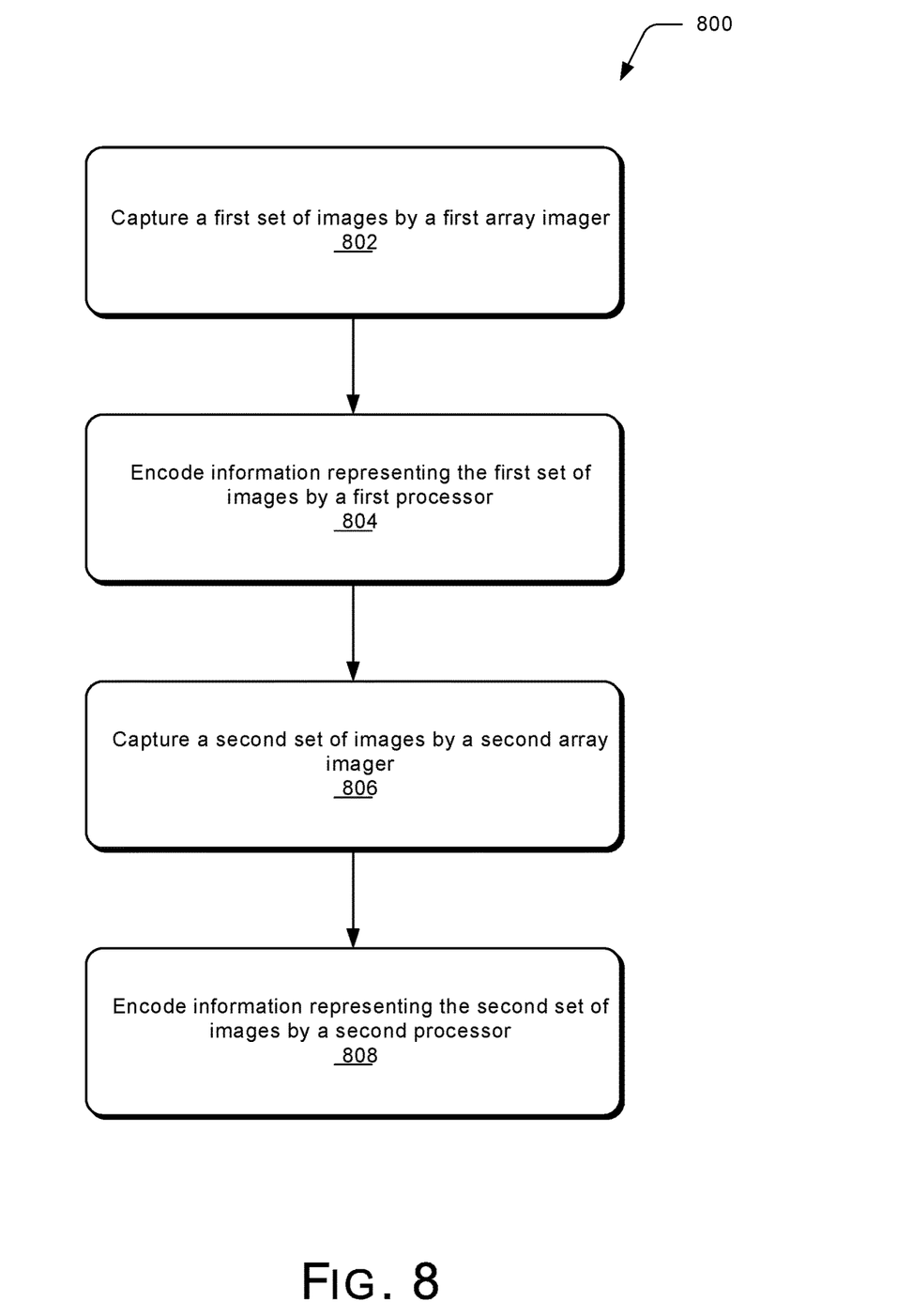
FIG. 8 illustrates an example process for implementing the techniques discussed herein in accordance with one or more embodiments.

FIG. 8 illustrates an example process 800 for implementing the techniques discussed herein in accordance with one or more embodiments. Process 800 is carried out at least in part by a computing device such as computing device 102 of FIG. 1 and can be implemented in software, firmware, hardware, or combinations thereof. Process 800 is shown as a set of acts and is not limited to the order shown for performing the operations of the various acts.

In process 800 a first set of images is captured by a first array imager (act 802). The array imager includes multiple imagers of the same or different types as discussed above.

Information representing the first set of images is encoded by a first processor (act 804). The encoding of information representing the first set of images includes performing one or more of various types of encoding as discussed above, such as spectral prediction, spatial prediction, temporal prediction, 3D encoding, and so forth.

A second set of images is captured by a second array imager (act 806). The second array imager can be the same array imager as the first array imager in act 802 or alternatively a different array imager than the first array imager.

Information representing the second set of images is encoded by a second processor (act 808). The second processor is a different processor than the first processor in act 804. The encoding of information representing the second set of images includes performing one or more of various types of encoding as discussed above, such as spectral prediction, spatial prediction, temporal prediction, 3D encoding, and so forth.

Figure 9:
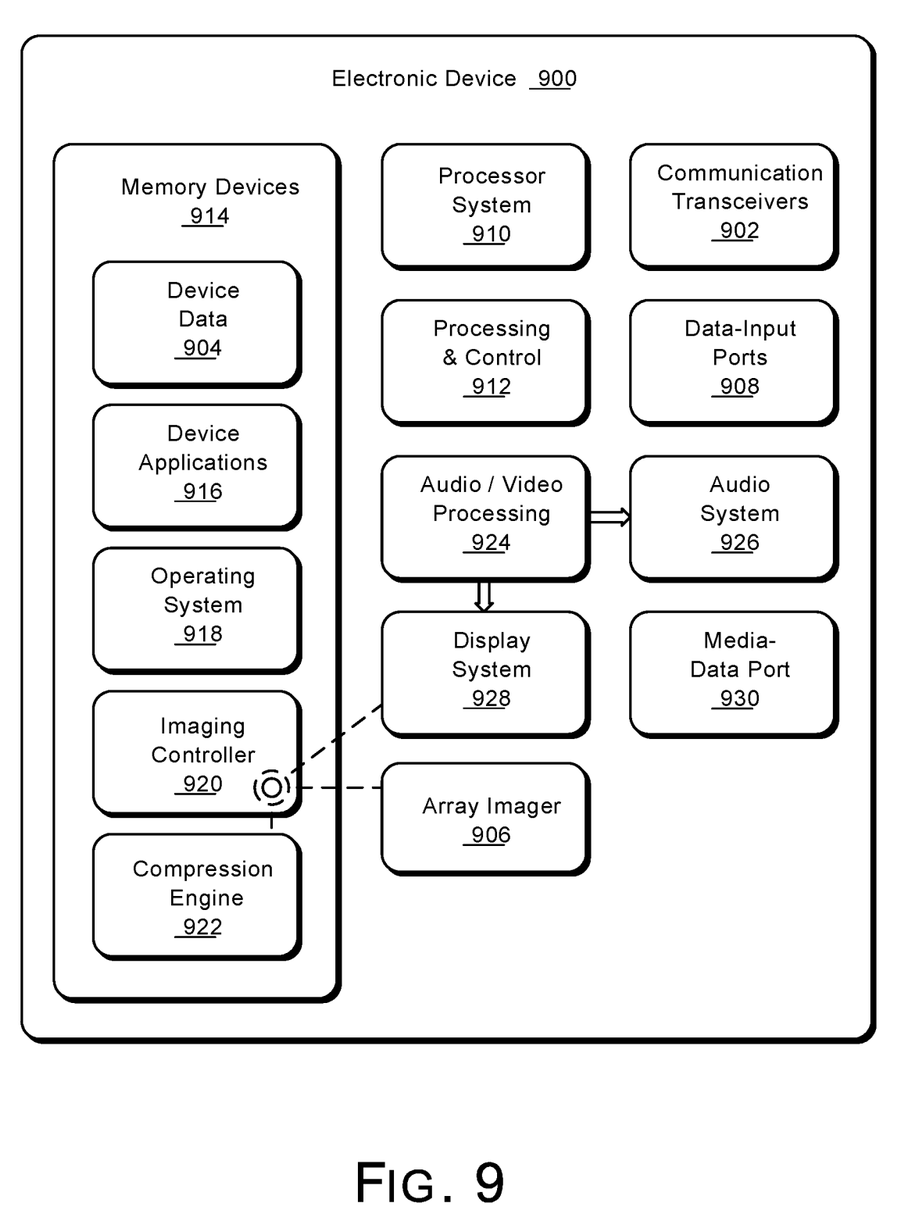
FIG. 9 illustrates various components of an example electronic device that can implement embodiments of the techniques discussed herein.

FIG. 9 illustrates various components of an example electronic device 900 that can be implemented as a computing device as described with reference to any of the previous FIGS. 1 through 8. Electronic device 900 can be, or include, many different types of devices capable of implementing multi-processor support for array imagers. For example, electronic device 900 may include a camera (e.g., plenoptic), phone, personal navigation device, gaming device, Web-browsing platform, pager, media player, or any other type of electronic device, such as the computing device 102 described with reference to FIG. 1.

Electronic device 900 includes communication transceivers 902 that enable wired or wireless communication of device data 904, such as received data and transmitted data. Example communication transceivers include WPAN radios compliant with various Institute of Electrical and Electronics Engineers (IEEE) 802.15 (Bluetooth™) standards, WLAN radios compliant with any of the various IEEE 802.11 (WiFi™) standards, WWAN (3GPP-compliant) radios for cellular telephony, wireless metropolitan area network radios compliant with various IEEE 802.16 (WiMAX™) standards, and wired LAN Ethernet transceivers.

In embodiments, the electronic device 900 includes array imager 906, such as array imager 106 as described with reference to FIG. 1, or any of array imagers 212, 214, 216, or 218 described with reference to FIG. 2, or any of array imagers 402 or 404 described with reference to FIG. 4, or any of array imagers 502 or 504 described with reference to FIG. 5. The array imager 906 can be implemented to facilitate various embodiments of multi-processor support for array imagers.

Electronic device 900 may also include one or more data-input ports 908 via which any type of data, media content, and inputs can be received, such as user-selectable inputs, messages, music, television content, recorded video content, and any other type of audio, video, or image data received from any content or data source. Data-input ports 908 may include USB ports, coaxial-cable ports, and other serial or parallel connectors (including internal connectors) for flash memory, DVDs, CDs, and the like. These data-input ports may be used to couple the electronic device to components, peripherals, or accessories such as keyboards, microphones, or cameras.

Electronic device 900 of this example includes processor system 910 (e.g., any of application processors, microprocessors, digital-signal processors, controllers, and the like) or a processor and memory system (e.g., implemented in a system-on-chip), which processes computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternatively or in addition, the electronic device can be implemented with any one or combination of software, hardware, firmware, or fixed-logic circuitry that is implemented in connection with processing and control circuits, which are generally identified at 912 (processing and control 912). Although not shown, electronic device 900 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Electronic device 900 also includes one or more memory devices 914 that enable data storage, examples of which include random-access memory, non-volatile memory (e.g., read-only memory, flash memory, erasable-programmable-read-only memory, electrically-erasable-programmable-read-only memory, etc.), and a disk storage device. Memory devices 914 are implemented at least in part as a physical device that stores information (e.g., digital or analog values) in storage media, which does not include propagating signals or waveforms. The storage media may be implemented as any suitable types of media such as electronic, magnetic, optic, mechanical, quantum, atomic, and so on. Memory devices 914 provide data-storage mechanisms to store the device data 904, other types of information or data, and various device applications 916 (e.g., software applications). For example, operating system 918 can be maintained as software instructions within memory devices 914 and executed by processors 910. In some aspects, imaging controller 920 and compression engine 922 are embodied in memory devices 914 of electronic device 900 as executable instructions or code. Although represented as a software implementation, imaging controller 920 and compression engine 922 may be implemented as any form of a control application, software application, signal processing and control module, firmware that is installed on the device, chips or other hardware, and so on.

Electronic device 900 also includes audio and video processing system 924 that processes audio data and passes through the audio and video data to audio system 926 and to display system 928. Audio system 926 and display system 928 may include any modules that process, display, or otherwise render audio, video, display, or image data, such as imaging controller 920 and compression engine 922. Display data and audio signals can be communicated to an audio component and to a display component via a radio-frequency link, S-video link, HDMI, composite-video link, component-video link, digital video interface, analog-audio connection, or other similar communication link, such as media-data port 930. In some implementations, audio system 926 and display system 928 are external components to electronic device 900. Alternatively or additionally, display system 928 can be an integrated component of the example electronic device, such as part of an integrated display and touch interface.

Although embodiments of techniques for implementing multi-processor support for array imagers have been described in language specific to features or methods, the subject of the appended claims is not necessarily limited to the specific features or methods described. Rather, the specific features and methods are disclosed as example implementations of techniques for implementing multi-processor support for array imagers.

We claim:

1. A smartphone, comprising:
   at least one non-transitory computer-readable media to store instructions;
   one or more processors;
   a display; and
   an array imager including a plurality of image sensors, wherein
   a first image sensor among the plurality of image sensors is configured to capture a first plurality of images that depict substantially a same scene at substantially a same time, and
   a second image sensor among the plurality of image sensors is configured to capture a second plurality of images that depict substantially the same scene at substantially the same time, and
   the one or more processors are configured to execute the instructions to:
   obtain the first plurality of images and the second plurality of images,
   perform a first encoding task, via a first core from among the one or more processors, with respect to a first subset of images among the first plurality of images and a first subset of images among the second plurality of images, and
   perform a second encoding task, via a second core from among the one or more processors, with respect to a second subset of images among the first plurality of images and a second subset of images among the second plurality of images.

2. The smartphone of claim 1, wherein the display is disposed on a first side of the smartphone, and the array imager is disposed on a second side of the smartphone which is opposite to the first side of the smartphone.

3. The smartphone of claim 1, wherein the array imager includes at least two image sensors among the plurality of image sensors that have different filters.

4. The smartphone of claim 1, wherein the array imager includes at least two image sensors among the plurality of image sensors that have different spectral sensitivities.

5. The smartphone of claim 1, wherein the array imager includes at least two image sensors among the plurality of image sensors that have different pixel sizes.

6. The smartphone of claim 1, wherein the array imager includes at least two image sensors among the plurality of image sensors that have a same resolution.

7. The smartphone of claim 1, wherein
   the first encoding task includes one or more of spatial prediction, temporal prediction, spectral prediction, spatio-temporal prediction, spatio-spectral prediction, spatio-temporal-spectral prediction, or three-dimensional encoding, and
   the second encoding task includes one or more of spatial prediction, temporal prediction, spectral prediction, spatio-temporal prediction, spatio-spectral prediction, spatio-temporal-spectral prediction, or three-dimensional encoding.

8. The smartphone of claim 1, wherein the first image sensor is configured to sense visible light and the second image sensor is configured to sense infrared light.

9. The smartphone of claim 8, further comprising an imaging controller to adjust the first image sensor from being configured to sense visible light to being configured to sense infrared light and to adjust the second image sensor from being configured to sense infrared light to being configured to sense visible light.

10. The smartphone of claim 1, further comprising:
    a second array imager including a second plurality of image sensors,
    wherein
    a third image sensor among the second plurality of image sensors is configured to capture a third plurality of images that depict substantially the same scene at substantially the same time, and
    a fourth image sensor among the second plurality of image sensors is configured to capture a fourth plurality of images that depict substantially the same scene at substantially the same time, and
    the one or more processors are configured to execute the instructions to:
    obtain the third plurality of images and the fourth plurality of images,
    perform the first encoding task, via a third core from among the one or more processors, with respect to a first subset of images among the third plurality of images and a first subset of images among the fourth plurality of images, and
    perform the second encoding task, via a fourth core from among the one or more processors, with respect to a second subset of images among the third plurality of images and a second subset of images among the fourth plurality of images.

11. The smartphone of claim 1, wherein the first encoding task and the second encoding task are performed in parallel.

12. The smartphone of claim 1, wherein
    the first encoding task and the second encoding task are performed sequentially,
    the first encoding task includes spatial prediction or spectral prediction, and
    the second encoding task includes temporal prediction or three-dimensional encoding.

13. The smartphone of claim 1, wherein the first image sensor and the second image sensor are aligned along a first direction.

14. The smartphone of claim 13, wherein
    the plurality of image sensors includes a third image sensor, and the third image sensor is offset from the first image sensor and the second image sensor in a second direction perpendicular to the first direction.

15. The smartphone of claim 1, wherein the display is disposed on a first side of the smartphone, and the array imager is disposed on the first side of the smartphone.

16. The smartphone of claim 15, wherein the first image sensor is configured to sense visible light and the second image sensor is configured to sense infrared light.

17. The smartphone of claim 15, wherein the array imager includes at least two image sensors among the plurality of image sensors that have different filters.

18. The smartphone of claim 15, the array imager includes at least two image sensors among the plurality of image sensors that have different spectral sensitivities.

19. The smartphone of claim 15, the array imager includes at least two image sensors among the plurality of image sensors that have different pixel sizes.

20. The smartphone of claim 15, wherein the array imager includes at least two image sensors among the plurality of image sensors that have a same resolution.

\* \* \* \* \*